United States Patent [19]

Rademachers et al.

[11] Patent Number: 5,002,609
[45] Date of Patent: Mar. 26, 1991

[54] IRON OXIDE BLACK PIGMENT GRANULES, PROCESSES FOR THEIR PREPARATION AND THEIR USE

[75] Inventors: Jakob Rademachers; Wolfgang Bockelmann; Klaus Gauler, all of Krefeld, Fed. Rep. of Germany

[73] Assignee: Bayer Aktiengesellschaft, Leverkusen-Bayerwerk, Fed. Rep. of Germany

[21] Appl. No.: 498,970

[22] Filed: Mar. 26, 1990

[30] Foreign Application Priority Data

Apr. 4, 1989 [DE] Fed. Rep. of Germany ....... 3910779

[51] Int. Cl.$^5$ ............................................. C09C 3/00
[52] U.S. Cl. .................................... 106/456; 423/634; 252/62.56

[58] Field of Search ................ 106/456; 423/632, 633, 423/634; 252/62.56

[56] References Cited

U.S. PATENT DOCUMENTS 3,843,380 10/1974 Beyn et al. ........................... 106/300
4,261,966 4/1981 Portes ................................... 423/633

*Primary Examiner*—Mark L. Bell
*Assistant Examiner*—Chris Gallo
*Attorney, Agent, or Firm*—Connolly and Hutz

[57] ABSTRACT

A process is disclosed for preparing dispersant-free iron oxide pigment granules by spraying or atomizing an iron oxide black pigment suspension and heating the resulting granules at a temperature of 400°–800° C. The granules are useful for coloring building materials such as concrete.

16 Claims, No Drawings

IRON OXIDE BLACK PIGMENT GRANULES, PROCESSES FOR THEIR PREPARATION AND THEIR USE

The present invention relates to dispersant-free iron oxide black pigment granules which are stable during handling, processes for their preparation and their use.

Iron oxide black pigments consist of oxides of divalent and trivalent iron having the magnetite structure. They are prepared either by the single-stage or two-stage precipitation process from iron(II) salt solutions or by the aniline process by reduction of nitrobenzene with metallic iron (Ullmanns Encyklopädie der techn. Chem. [Ullmann's Encyclopaedia of Industrial Chemistry], 4th edition, Volume 18, page 603, Verlag Chemie, Weinheim 1979).

Usually, the iron oxide black pigments obtained in the course of the preparation process as intermediates in the aqueous phase, in the form of filter cakes, are dried and then milled to a greater or lesser extent, depending on the field of use. Thus, the iron oxide black pigments which are used for colouring coatings or plastics must be subjected to more intensive milling than those which are used for colouring concrete. These are milled to a moderate extent to give a pigment powder.

Although iron oxide black pigments are now used as a rule in this powder form, they do have disadvantages since they tend to form dust and are difficult to meter. The customary processes for the preparation of dust-free granules, for example relatively coarse granules by means of disc granulators or relatively fine granules by atomisation in spray-driers, are successful in the case of iron oxide black pigments only when the formation of granules is carried out with the addition of binders, since otherwise the granules do not have sufficient strength and readily disintegrate.

The addition of binders also has considerable disadvantages. Depending on the type of binder, the proportion of water-soluble constituents is increased beyond the desired level, so that these pigment granules cannot be used universally On the other hand, because of their binding power, they have an adverse effect on the dispersion behaviour of the pigment.

Hence, DE-A 3 619 363 proposes, for colouring concrete, the use of pigment granules to which dispersants have been added.

It is the object of this invention to provide stable, iron oxide black pigment granules which can be used universally and do not have the disadvantages described.

These iron oxide black pigments should be obtainable in an economical process.

This object was achieved by forming aqueous iron oxide black suspensions into pigment granules by spraying or atomisation and heating the granules obtained. It has in fact been found that the strength and flow behaviour of the granules are improved by heating. The increase in the strength is sufficient to ensure that the porous granules can be handled without disintegration. On the other hand, the increase in strength is not so great that it adversely affects the dispersibility, in particular in concrete.

This invention thus relates to a process for the preparation of dispersant-free iron oxide pigments which are stable during handling, by spraying or atomisation of iron oxide black pigment suspensions, wherein the iron oxide black pigment granules obtained are heated.

Heating is preferably carried out at 400° C. to 800° C., preferably at 500° C. to 700° C., in a mildly reducing, inert or mildly oxidizing atmosphere. The iron oxide black pigment suspensions advantageously have a solids content of 50 to 75% by weight.

For the purposes of this invention, hydrogen contents of up to 1% by volume are mildly reducing and oxygen contents of up to 3% by volume are mildly oxidising.

Since the required heating times are very short, the process according to the invention can be carried out in one process step. Hot-gas spray reactors, for example reaction cyclones, are particularly suitable for this purpose. Heating in spray reactors is complete in residence times of less than 5 sec and in some cases in substantially shorter times, such as less than 1 second. However, the process according to the invention can also be divided into two process steps, namely preparation of the granules from aqueous suspensions containing 50 to 75% of solid in specially designed spray driers, and heating in a downstream unit, such as, for example, a rotary tubular kiln. Advantageously, residence times of 5 min to 1 hour, preferably 10 to 30 min, should be maintained here. In principle, a longer residence time has no adverse effect. It is of course also possible, in the two-stage process described, to carry out heating by flash calcination in a high-temperature chamber.

Another advantage of the process according to the invention is that, in the preferred embodiment of atomisation and heating in one step in a hot-gas spray reactor, no overheating of the pigment granules above the desired temperature can occur. It is known that overheating has an adverse effect on the pigment quality, since the colour strength considerably decreases as a result of sintering.

Particularly good results are obtained when granule formation takes place in the spray-drier via a one-material nozzle. Larger granules can be obtained with a one-material nozzle than with the two-material nozzle or with the rotating-disc atomiser If it is necessary to store the still unheated granules temporarily in bins, it is advisable to add a binder during preparation of the granules According to the invention, binders which decompose in the subsequent heating step, preferably ammonium salts of polyacrylic acid, preferably in amounts of 0.1 to 1% by weight, are preferably used ,here. Heating in a mildly oxidising atmosphere is advantageous here.

Although granules and not powders are present in the heating zone, it is surprising that in this case too the improvement achieved in the pigment quality is on the same scale as that described in DE-A 3 620 333, namely an improvement in the hue and in the colour strength of the black pigment.

If micronised pigments are desired, the granules according to the invention can also advantageously be subjected to milling. Accordingly, a separate production line is not necessary.

The invention also relates to the iron oxide black pigment granules obtainable by the process according to the invention. The granules obtained by spray-drying 25 preferably have an agglomerate size of 5 to 500 μm, preferably from 100 to 300 μm, depending on the method of atomisation and the solids concentration of the suspension used. The higher the pigment content of the suspension used, the greater is the diameter of the granules obtained.

If the suspensions are subjected to fluidised-bed spray process, the size of the agglomerates is 200 to 5000 μm.

Another advantage of the process according to the invention is that the iron oxide black pigments obtained can be used universally as they do not have a high content of water-soluble salts.

The invention furthermore relates to the use of the iron oxide black pigment granules according to the invention for colouring building materials, in particular concrete components, fibre cement components, redders, joint sealing material, flagstones or paving stones The Examples which follow are intended to illustrate the process of the invention in more detail but do not imply restriction to the Examples.

In the case of the Examples mentioned, the determination of the efflux time using the DIN 4 beaker (DIN 53,211 of April 1974) was applied analogously to the powders to be tested.

EXAMPLE 1

An aqueous iron oxide black suspension containing 50% by weight of solids (precursor of Bayferrox 120 N, commercial product of Bayer AG) was fed at 10 l/h to a reaction cyclone via a two-material nozzle operated with nitrogen. The reactor burner was operated with a slight deficiency of air. The reactor temperature was 700° C. The pigment obtained had $Fe^{III}/Fe^{II}$ weight ratio of 1.9 to 2.0, was blue-tinged and had a higher colour strength than Bayferrox 330 (commercial product of Bayer AG) The diameters of the granules were 10 to 100 μm and the BET surface area was 13 m²/g. The dispersibility in cement mixtures was satisfactory.

EXAMPLE 2

30 l of aqueous iron oxide black suspension from Example 1 were atomised per hour in a spray-drier via a one-material nozzle having a 1.1 mm orifice, under an initial pressure of 4 bar. From the large-area burner operated with natural gas and a large excess of air, the flue gases entered the drier at a temperature of 500° C. At an exhaust gas temperature of 130° C., the pigment temperature was about 90° C.

24 kg per hour of brown-tinged granules having diameters of 150 to 250 μm were obtained The moisture content was to 5% by weight. The efflux rate from the 4 mm DIN cup was 61 seconds.

The granules obtained were then fed to a rotary tubular kiln measuring 2 m in length and 30 cm in diameter. The kiln was heated indirectly with natural gas burners. The rotary speed was 5 rpm and the inclination wa 1.5%. Nitrogen (4 m³ (S.T.P.)/h) with 3.5% by volume of admixed air was passed counter-current into the kiln. The maximum temperature in the product was 680° C. The granules obtained after cooling had virtually the same diameter distribution as the product introduced. The bulk density was 0.93 kg/l. In cement mixtures, the dispersibility was good The hue was bluer and the colour strength higher than the comparative pigment Bayferrox 330 (commercial product of Bayer AG) The BET surface area was 13 m²/g and the $Fe^{III}/Fe^{II}$ weight ratio was 2. The efflux rate from the 4 mm DIN cup was only 53 seconds.

What is claimed is:

1. A process for the preparation of dispersant-free iron oxide black pigment granules which are stable during handling, wherein an iron oxide black pigment suspension is sprayed or atomized to form granules and said granules are heated to a temperature from about 400 to 800° C.

2. A process as claimed in claim 1 wherein said heating is carried out in a mildly reducing atmosphere, having a hydrogen content of up to 1% by volume; an inert atmosphere; or a mildly oxidizing atmosphere, having an oxygen content of up to 3% by volume.

3. A process as claimed in claim 2 wherein heating is carried out at 500°–700° C.

4. A process as claimed in claim 1 wherein the iron oxide black pigment suspension has a solids content of 50 to 75% by weight.

5. A process as claimed in claim 1 wherein the iron oxide black pigment suspension contains thermally unstable organic compounds.

6. A process as claimed in claim 5 wherein the thermally unstable organic compounds are ammonium slats of polyacrylic acid present in amounts of 0.1 to 1% by weight.

7. A process as claimed in claim 1 wherein formation of the granules and heating are carried out in one process step.

8. A process as claimed in claim 7 wherein said one process step is carried out in a hot gas spray reactor.

9. A process as claimed in claim 1 wherein granule formulation and heating are carried out in two separate steps.

10. A process as claimed in claim 9 wherein the granule formation step is carried out in a spray drier and the heating step is carried out in rotary tubular kiln.

11. A process as claimed in claim 10 wherein granule formation is carried out in a spray drier via a one-material nozzle.

12. Iron oxide black pigment granules obtained by the process set forth in claim 1.

13. Iron oxide black pigment granules obtained by th process set forth in claim 2.

14. Iron oxide black pigment granules obtained by the process set forth in claim 3.

15. Iron oxide black pigment granules obtained by the process set forth in claim 8.

16. Iron oxide black pigment granules obtained by the process set forth in claim 9.

* * * * *